(12) United States Patent
Lee

(10) Patent No.: US 7,447,580 B2
(45) Date of Patent: Nov. 4, 2008

(54) METHOD FOR MEASURING ABSOLUTE STEERING ANGLE OF STEERING SHAFT FOR VEHICLE

(75) Inventor: Jong-Hwa Lee, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 707 days.

(21) Appl. No.: 11/002,284

(22) Filed: Dec. 3, 2004

(65) Prior Publication Data

US 2005/0137768 A1 Jun. 23, 2005

(30) Foreign Application Priority Data

Dec. 23, 2003 (KR) ...................... 10-2003-0095123

(51) Int. Cl.
*G01B 5/24* (2006.01)
(52) U.S. Cl. ..................... 701/41; 702/151; 180/6.2; 33/1 PT
(58) Field of Classification Search .................. 701/41; 702/151; 180/6.2; 33/1 PT
See application file for complete search history.

(56) References Cited

U.S. PATENT DOCUMENTS

| | | | |
|---|---|---|---|
| 5,239,490 A * | 8/1993 | Masaki et al. ................. | 702/41 |
| 5,930,905 A | 8/1999 | Zabler | |
| 6,466,889 B1 | 10/2002 | Schodlbauer | |
| 6,862,551 B1 * | 3/2005 | Kang et al. ................. | 702/151 |
| 6,941,241 B2 * | 9/2005 | Lee et al. .................... | 702/151 |
| 7,050,895 B2 * | 5/2006 | Lee et al. ...................... | 701/41 |

OTHER PUBLICATIONS

U.S. Appl. No. 10/748,152, filed Dec. 31, 2003.
U.S. Appl. No. 10/330,325, filed Dec. 30, 2002.
U.S. Appl. No. 10/748,151, filed Dec. 31, 2003.
U.S. Appl. No. 10/748,239, filed Dec. 31, 2003.
U.S. Appl. No. 11/002,280, filed Dec. 31, 2004.

* cited by examiner

*Primary Examiner*—Mark Hellner
(74) *Attorney, Agent, or Firm*—Greenblum & Bernstein, P.L.C.

(57) ABSTRACT

A method for measuring an absolute steering angle of a steering shaft for a vehicle using two rotatable bodies that rotate together with the steering shaft of the vehicle at a predetermined rotation ratio.

4 Claims, 4 Drawing Sheets

[FIG. 1]
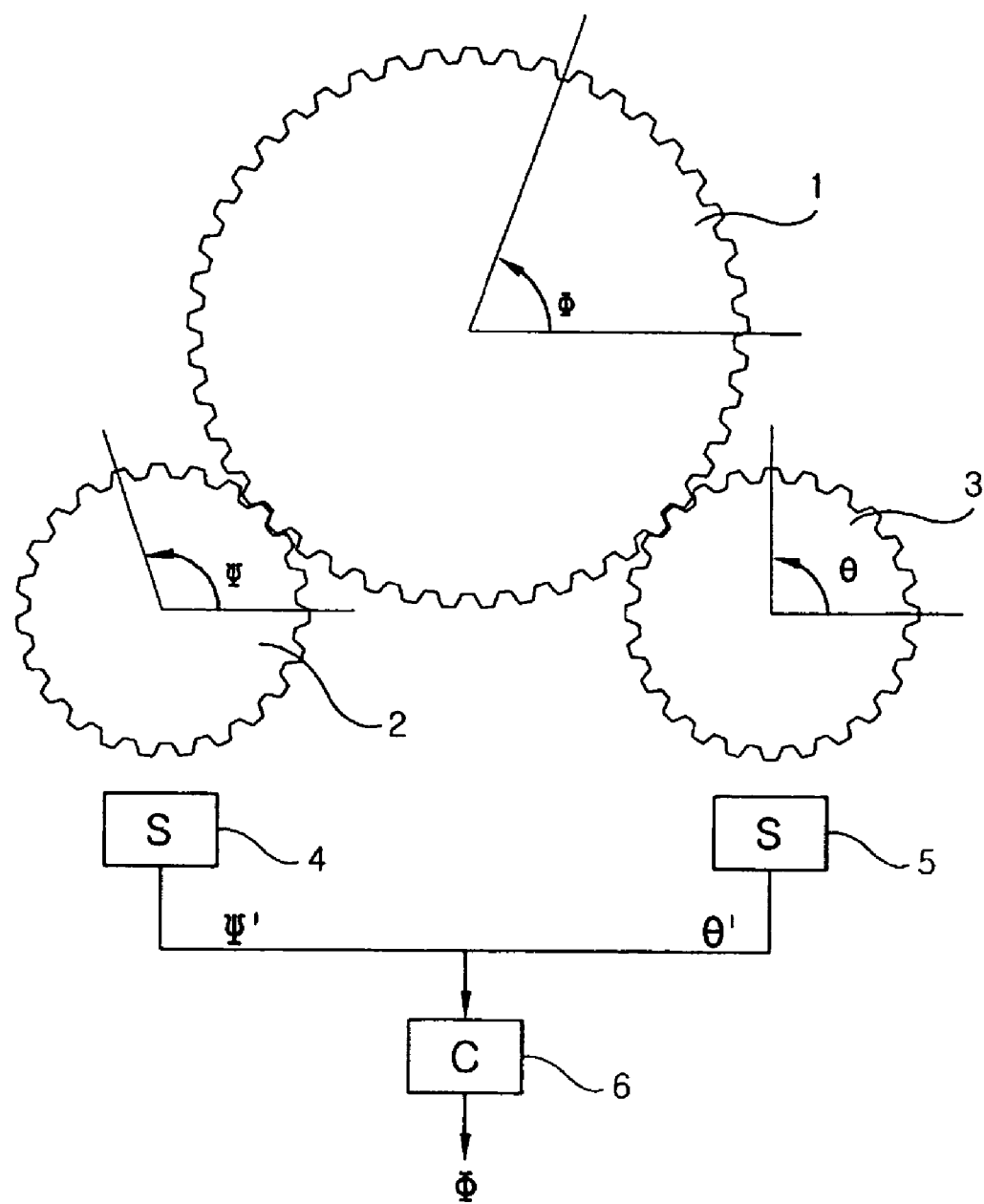

[FIG. 2]
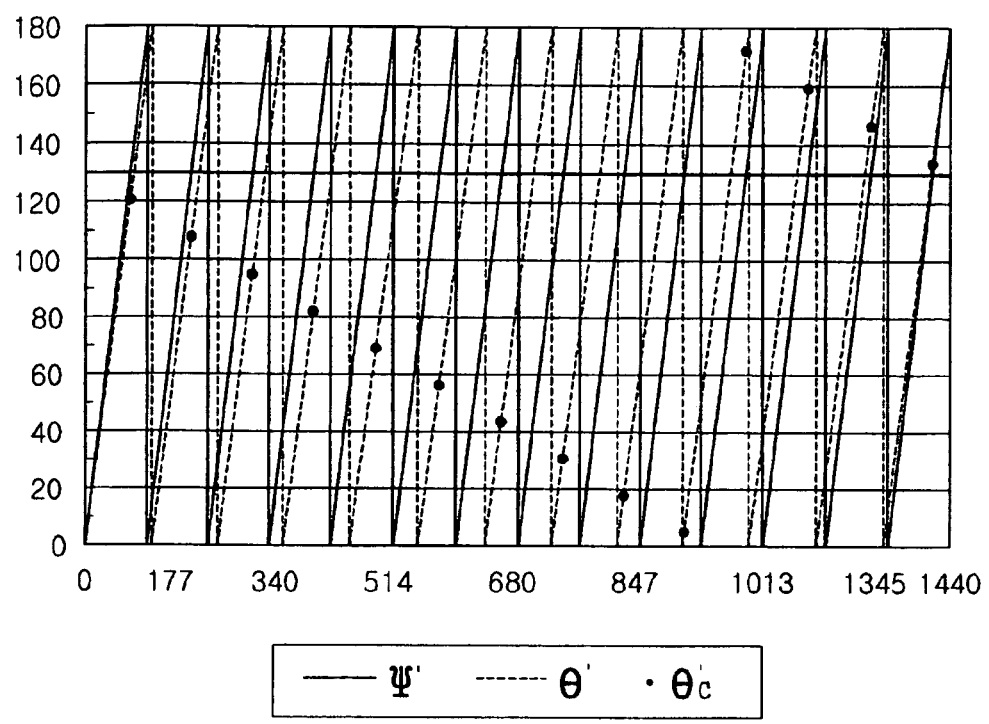

[FIG. 3]
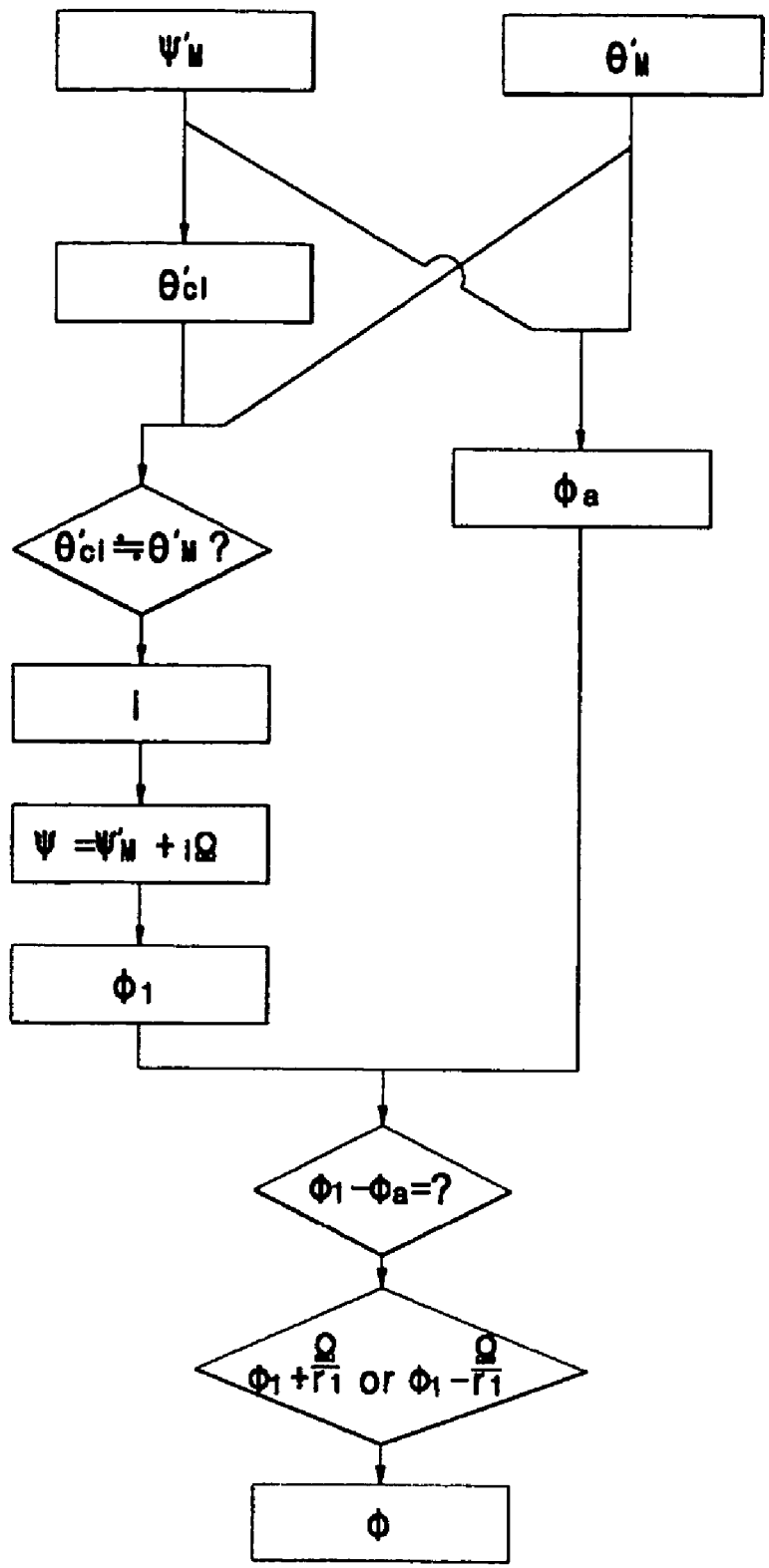

[FIG. 4]
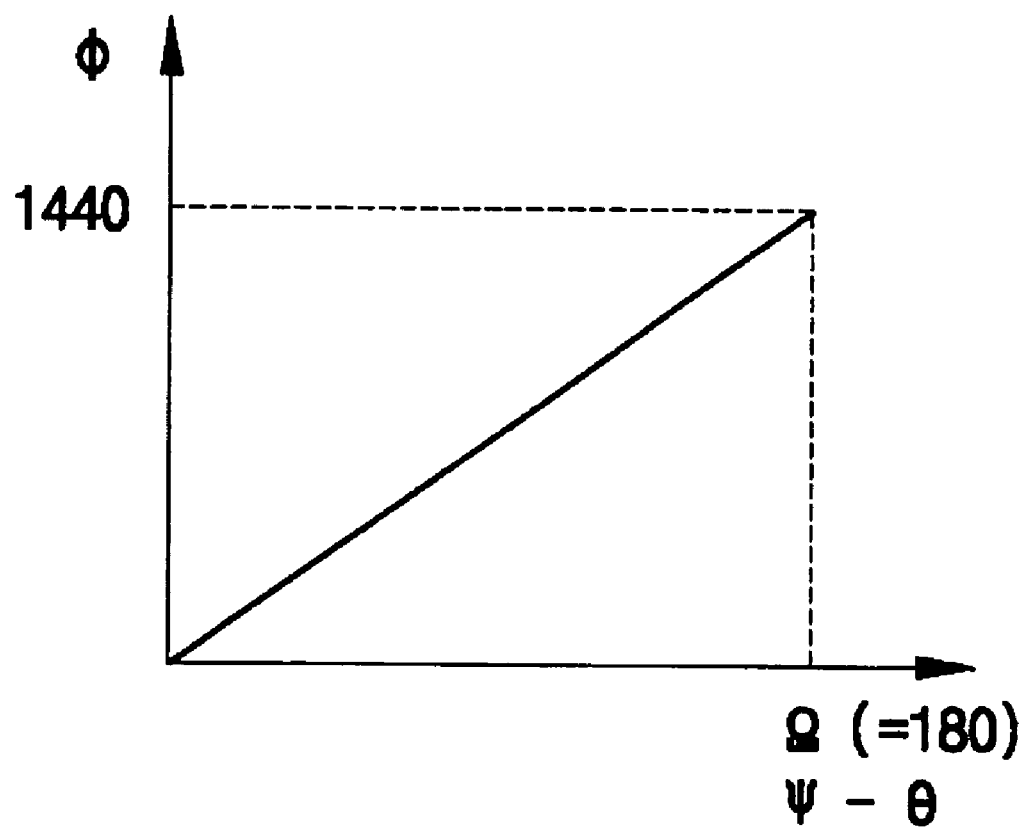

METHOD FOR MEASURING ABSOLUTE STEERING ANGLE OF STEERING SHAFT FOR VEHICLE

RELATED APPLICATIONS

The present disclosure relates to subject matter contained in priority Korean Application No. 10-2003-0095123, filed on Dec. 23, 2003, which is herein expressly incorporated by reference in its entirety.

BACKGROUND OF THE INVENTION

1. Field of the Invention

The present invention relates to a method for measuring an absolute steering angle of a steering shaft for a vehicle, more specifically, to a method for measuring an absolute steering angle of a steering shaft by using two rotatable bodies that rotate together with the steering shaft at a predetermined rotation ratio.

2. Description of the Related Art

In general, measurement of an absolute steering angle of a steering shaft using an angle sensor only is known to be difficult because the measurement range is greater than 360°.

Also the steering angle of the steering shaft should be immediately measured following start-up of a vehicle, regardless of an initial angular position. But the prior steering angle would not measured at present stage.

U.S. Pat. Nos. 5,930,905 and 6,466,889B1 disclose a method for measuring an absolute steering angle of a steering shaft based on rotational angular measurements of a first rotatable body and a second rotatable body that rotate together with a steering shaft at a predetermined rotation ratio.

In the disclosures, the absolute rotational angle of the first rotatable body and of the second rotatable body are expressed by $\Psi=\Psi'+i\Omega$ and $\theta=\theta'+j\Omega$, respectively (wherein, $\Omega$ indicates a measurement range of an angle sensor measuring the $\Psi'$ and the $\theta'$; i is a whole number representing the number of times when the first rotatably body's absolute rotational angle $\Psi$ is greater than the $\Omega$, i.e. a frequency of the first rotatable body; and j is a frequency of the second rotatable body), and the absolute steering angle, $\Phi$, can be obtained through a specific calculation procedure using measurements of $\Psi'$ and $\theta'$.

According to the U.S. Pat. No. 5,930,905, the measurements of $\Psi'$ and $\theta'$ are substituted to the following equation (1), which is derived from a geometrical relation among $\Psi$, $\theta$, and $\Phi$ to get k, and by rounding off k, a whole number k is obtained. Then the k, $\Psi'$ and $\theta'$ are substituted to the following equation (2) to obtain $\Phi$.

$$k=\{(m+1)\Theta'-m\Psi'\}/\Omega \qquad \text{<Equation 1>}$$

$$\Phi=\{m\Psi'+(m+1)\Theta'-(2m+1)k\Omega\}/2n \qquad \text{<Equation 2>}$$

(Here, m indicates the number of gear teeth of the first rotatable body; m+1 indicates the number of gear teeth of the second rotatable body; and n indicates the number of gear teeth formed on the steering shaft engaged with the first and second rotatable bodies.)

On the other hand, according to the U.S. Pat. No. 6,466,889B1, the steering angle, $\Phi$, can be obtained directly from a relation between the difference of absolute rotational angles of two rotatably bodies, $\Psi-\theta$, and 'i' of the first rotatable body (or the second rotatable body). Here, $\Psi-\theta$ is obtained by adding $\Omega$ to a measurement of $\Psi'-\theta'$ if the measurement is a negative value, or by applying a measurement of $\Psi'-\theta'$ if the measurement is not a negative value. The 'i' is calculated from the relation between $\Psi-\theta$, and i, and $\Psi$ is calculated from the known values of $\Psi'$ and i. Based on these values, the absolute steering angle of a steering shaft, $\Phi$, is obtained.

When 'i' becomes k1 as the steering shaft is rotated with maximal, the rotational angle difference $\Psi-\theta$ should be equal or less than the measurement range of the angle sensor, namely $\Omega$ (cf. in the U.S. Pat. No. 6,466,889B1, $\Psi-\theta$ is set to be equal to $\Omega$). In other words, the rotational angle difference $\Psi-\theta$ successively varies from 0° to $\Omega$ until the steering shaft is rotated with maximal, and i-value varies step by step from 0 to k1.

In particular, the U.S. Pat. No. 6,466,889B1 made an assumption that $\Psi-\theta$ and i-value are in a linearly proportional relation with each other, meaning that the value for i successively varies from 0 to k1 as the rotational angle difference $\Psi-\theta$ successively varies from 0° to $\Omega$. Also, the value of 'i' is obtained by taking a maximum whole number that is smaller than a value obtained from the multiplication of $\Psi-\theta$ measured value and k1/$\Omega$. For example, if $\psi-\theta$ times k1/$\Omega$ equals to 5.9 . . . , the resulting i-value is 5.

However, the above method suggested in U.S. Pat. No. 6,466,889B1 poses a problem that 'i–j' has to be either 0 or 1 and should not be greater than 2 because a maximum value of $\Psi-\theta$ cannot be greater than $\Omega$.

SUMMARY OF THE INVENTION

It is, therefore, an object of the present invention to provide a method for measuring an absolute steering angle of a steering shaft rotating by more than 360 degrees, capable of removing a possibility of measurement errors influenced by a state of the steering angle of the steering shaft and thus, measuring a more accurate absolute steering angle with respect to every possible state of the steering angle of the steering shaft.

As for the method for measuring a steering angle of a steering shaft for a vehicle, a first rotatable body that rotates together with the steering shaft at a ratio of r1, and a second rotatable body that rotates together with the steering shaft at a ratio of r2 are used.

An absolute rotational angle of the first rotatable body, $\Psi$, can be expressed as $\Psi'+i\Omega$, and an absolute rotational angle of the second rotatable body, $\theta$, can be expressed as $\theta'+j\Omega$. $\Psi'$ and $\theta'$ are measured by an angle sensor. Here, $\Omega$ represents a measurement range of the angle sensor for measuring $\Psi'$ and $\theta'$, i is a whole number that represents a frequency of the first rotatable body indicating the number of times when the absolute rotational angle $\Psi$ of the first rotatable body is greater than the $\Omega$, and j is a frequency of the second rotatably body. In other words, the absolute rotational angle of the first rotatable body, $\Psi$, can be expressed by $\Psi'+i\Omega$, wherein $\Psi'$ is a relative rotational angle measured by the angle sensor whose measurement range is $\Omega$. The absolute rotational angle of the second rotatable body, $\theta$, can be expressed in a same manner.

The measurement range of the angle sensor, $\Omega$, can be 180° or 360° or a different degree. As long as the angle sensor is suitable for the measurement of $\Psi'$ and $\theta'$, either a contact angle sensor or a non-contact angle sensor can be utilized. Preferably, AMR (Anisotropic Magneto-Resistance) sensor is used as the angle sensor.

In the present invention, the angle sensor whose measurement range is $\Omega$ is used to get $\Psi'$ and $\theta'$ measurements, i.e. $\Psi_M'$ and $\theta_M'$. Then, based on a relation between $\Psi'$ and $\theta'$, a plurality of $\theta$'s corresponding to the $\Psi_M'$ is calculated to obtain their calculation values $\theta_C$'s. By comparing the plurality of $\theta_C$'s to the $\theta_M'$, a frequency of the first rotatable body, i, is obtained, and the i-value is in turn used to get the absolute rotational angle Ψ of the first rotatable body. From a relation between Ψ and Φ, a steering angle Φ (hereinafter, it will be designated Φ1) as of a steering shaft.

In case the frequency 'i' includes an error, the resulting Φ1 has a greater error. For example, if the frequency i includes an error of '±1', the error range included the Φ1 becomes '±(Ω/r1)'.

Therefore, it is necessary to decide whether the Φ1 includes the above error for example. In a preferred embodiment of the invention, using a relation between Ψ–θ, namely a difference between the absolute rotational angle of the first rotatable body and the absolute rotational angle of the second rotatable body, and an absolute steering angle Φa of a steering shaft corresponding to the $\Psi_M'$ and the $\theta_M'$ is obtained. Then, the Φ1 and the Φa are compared to each other to find out whether the above type of error is included. When it is confirmed that the error is included, 'Ω/r1 is added/subtracted to/from the Φ1, to remove the error. In this manner, a more accurate absolute steering angle of a steering shaft can be obtained.

BRIEF DESCRIPTION OF THE DRAWINGS

The above objects, features and advantages of the present invention will become more apparent from the following detailed description when taken in conjunction with the accompanying drawings, in which:

FIG. 1 illustrates a preferred embodiment of the present invention;

FIG. 2 graphically illustrates a relation between Ψ' and θ' in accordance with a steering angle of a steering shaft;

FIG. 3 illustrates a calculation procedure to obtain an absolute steering angle of a steering shaft according to a preferred embodiment of the present invention; and FIG. 4 graphically illustrates a relation between 'Ψ–θ' and Φ.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 1 shows a first rotatable body 2 and a second rotatable body 3 being engaged with a steering shaft 1, angle sensors 4 and 5 for measuring relative rotational angles Ψ' and θ' of the first and second rotatable bodies, and an operational circuit 6 for conducting a designated operation using $\Psi'_M$ and $\theta'_M$ measurements provided by the sensors and for outputting a resulting Φ.

Here, a rotation ratio (r1) of the steering shaft to the first rotatable body is 7/4, and a rotation ratio (r2) of the steering shaft to the second rotatable body is 6.5/4 (the number of gear teeth in FIG. 1 may be variable). FIG. 2 graphically shows the relation between the relative rotational angle (Ψ') of the first rotatable body and a relative rotational angle (θ') of the second rotatable body when a steering shaft rotates 4 times in total. In FIG. 2, x-axis denotes the steering angle Φ, and Ω is 180°. FIG. 3 illustrates a calculation procedure for obtaining the absolute steering angle, Φ, of the steering shaft, based on measurements of the Ψ' and the θ'.

Most preferably, the relation between the relative rotational angles of the first and second rotatable bodies as shown FIG. 2 can be obtained by measuring how the relative rotational angle (ψ') of the first rotatable body and the relative rotational angle (θ') of the second rotatable body variation, depending on the variation of the steering angle of the steering shaft.

As shown in FIG. 3, $\psi_M'$ and $\theta_M'$ are measured by employing the angle sensor. Then by taking advantage of the relation shown in FIG. 2, a plurality of $\theta_C$'s corresponding the $\psi_M'$ is calculated ($\theta_C i'$ in FIG. 3 indicates $\theta_C'$ corresponding to 'i'). Then the closest value among the $\theta_C$'s to $\theta_M'$ is found to get i. For instance, suppose that $\Psi_M'=130°$, and $\theta_M'=105°$. As shown on the graph of FIG. 2, when $\Psi'=130°$, its corresponding $\theta_C$'s, given that i ranges from 0 to 13, are 120.7°, 107.9°, 95°, 82.1°, 69.3°, 56.4°, 43.6°, 30.7°, 17.9°, 5°, 172.1°, 159.3°, 146.4°, and 133.6°, successively. Among these values for $\theta_C$'s, 107.9° is the closest value to the $\theta_M$'s, which is 105°, so the corresponding i becomes 1.

Using the known i-value and $\Psi_M'$ values, the steering angle, Φ1, of the steering shaft can be calculated applying the following equation 5.

$$\Phi1=1/r1(\Psi_M'+i\Omega)=4/7(130°+180°)=177°. \qquad <\text{Equation 5}>$$

The above method is problematic when the actual relative rotational angle θ' of the second rotatable body is close to 0° or 180°. In this case, even a little measurement error could bring a big difference between the actual θ' and its measurement $\theta_M'$. As a result thereof, the frequency i could be errored. Here, the measurement error can be made by any kind, for example, a mechanical defect like backlash or an electrical defect like noise.

Suppose that the actual relative rotational angle ψ' of the first rotatable body is 130°, and the actual relative rotational angle θ' is 5°. Also suppose that the $\Psi_M'$ obtained by using the angle sensor is 130°, and the $\theta_M'$ including a measurement error is 178°. Under these conditions, a closest $\theta_C'$ to the 178° among the plural $\theta_C$'s corresponding to the $\Psi_M'$, i.e. 130° is 172.1°, and in this case i-value is 10. Substituting these obtained values to the equation 5, it is possible to calculate Φ1, which is 1102.9°.

However, if the measurement error were not included, the $\theta_M'$ would be 5°, the i-value would be 9, and the accurate Φ1 would be 1000°. That is to say, because the $\theta_M'$ itself has the measurement error, the absolute steering angle of the steering shaft derived therefrom is inevitably errored by 102.9° (=Ω/r1).

To resolve the above problem, the method of the invention includes the steps of: obtaining an absolute steering angle Φa of a steering shaft corresponding to the $\Psi_M'$ and the $\theta_M'$ out of a relation between Ψ–θ, namely a difference between the absolute rotational angle of the first rotatable body and the absolute rotational angle of the second rotatable body, and an absolute steering angle of a steering shaft; and if a difference between the Φ1 and the Φa is greater than a predetermined value, adding/subtracting Ω/r1 to/from the Φ1.

The relation between Ψ–θ, the difference between the absolute rotational angle of the first rotatable body and the absolute rotational angle of the second rotatable body, and the absolute steering angle of the steering shaft is shown in FIG. 4. In FIG. 4, x-axis denotes the difference between the absolute rotational angle of the first rotatable body and the absolute rotational angle of the second rotatable body (i.e. Ψ–θ), and y-axis denotes the absolute steering angle of the steering shaft (i.e. Φ). Here, 'Ψ–θ' can be obtained from '$\Psi_M'-\theta_M'$' or when the $\Psi_M'-\theta_M'$ is a negative value, the Ω is added thereto.

When the $\Psi_M'$ and the $\theta_M'$ have no measurement errors, it becomes possible to obtain an accurate value of the Ψ–θ, using the $\Psi_M'$ and the $\theta_M'$. Accordingly, the accurate absolute steering angle of the steering shaft can be obtained directly from FIG. 4. However, it is typical that the $\Psi_M'$ and the $\theta_M'$ include measurement errors. This also means that the absolute steering angle of the steering shaft obtained from FIG. 4 includes a lot of errors, being inappropriate to use. Especially, when the measurement error included in the $\Psi_M'$ is '+e', and the measurement error included in the $\theta_M'$ is '–e', the absolute steering angle of the steering shaft is even more severely errored. Here, Φa indicates the absolute steering angle of the steering shaft, which is obtained from FIG. 4 by using the $\Psi_M'$ and the $\theta_M'$. Particularly in the invention, Φa is used as a reference only to decide whether the Φ1 includes an error of Ω/r1.

In other words, when the difference between the Φ1 and the Φa is less than a predetermined value (hereinafter, it is referred to as ΔΦ1), Ω/r1 is added to the Φ1, while when the difference between the Φ1 and the Φa is greater than a predetermined value (hereinafter, it is referred to as ΔΦ2), Ω/r1 is subtracted from the Φ1. Following this procedure, the error included in the Φ1 can be removed and the accurate absolute steering angle of the steering shaft can be obtained. Preferably, ΔΦ1 and ΔΦ2 are equal to each other, and it does not matter which value they are, as long as the value can tell if the Φ1 includes an error of Ω/r1 therein. It is preferred, though, the ΔΦ1 and the ΔΦ2 are greater than Ω/r1−e1−e2 or not smaller than e1+e2, given that e1 is a maximum measurement error that can be included in the Φ1 and e2 is a maximum measurement error that can be included in the Φa.

In the following explanations we assume that the ΔΦ1 and the ΔΦ2 are 40°.

In the previous exemplary embodiment, the $\Psi_M'$ was 130°, the $\theta_M'$ including the measurement error was 178°, and the Φ1 was 1102.9°. Using these known values, it is possible to obtain the Ψ−Θ through the following equation 6.

$$\Psi-\Theta=\Psi'-\Theta'+\Omega=130°-178°+180°=132°. \quad \text{<Equation 6>}$$

Using the graph shown in FIG. 4, the resulting Φa is 1056°. The Φ1 is greater than the Φa by 46.9°, which is greater than the predetermined value (i.e. 40°). Therefore, it can be concluded that the Φ1 includes a lot of measurement errors, and the error-free absolute steering angle of the steering shaft can be obtained by subtracting 102.9° (=Ω/r1) from the Φ1, that is, 1000°=1102.9°−102.9°.

As for another exemplary embodiment, suppose that the actual relative rotational angle ψ' of the first rotatable body is 130°, and the actual relative rotational angle θ' is 172.1°. Also suppose that the $\Psi_M'$ obtained by using the angle sensor is 130°, and the $\theta_M'$ including a measurement error is 1°. Under these conditions, a closest $\theta_C'$ to the 1° among the plural $\theta_C'$s corresponding to the $\Psi_M'$, i.e. 130° is 5°, and in this case i-value is 9. Substituting these obtained values to the equation 5, it is possible to calculate Φ1, which is 1000°. Then, the Ψ−Θ can be obtained from the following equation 7.

$$\Psi-\Theta=\Psi'-\Theta'+\Omega=130°-1°=129°. \quad \text{<Equation 7>}$$

Using the graph shown in FIG. 4, the resulting Φa is 1032°. The Φ1 is less than the Φa by 32°, which is less than the predetermined value (i.e. 40°). Therefore, it can be concluded that the Φ1 includes a lot of measurement errors, and the error-free absolute steering angle of the steering shaft can be obtained by adding 102.9° (=Ω/r1) to the Φ1, that is, 1102.9°=1000°+102.9°.

In conclusion, the present invention can be advantageously used for obtaining an accurate absolute steering angle because the Ψ−Θ is not needed to get the frequency (i) of the first rotatable body. Even if the frequency (i) of the first rotatably body may include the measurement error (such as ±1), its consequent error included in the absolute steering angle of the steering shaft is eventually removed, resulting in the accurate absolute steering angle as desired.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for measuring an absolute steering angle of a steering shaft for a vehicle using a first rotatable body and a second rotatable body that rotate together with the steering shaft of the vehicle at a predetermined rotation ratio, respectively, the method comprising:

obtaining a measured angle $\Psi_M'$ by measuring a relative rotational angle Ψ' of the first rotatable body with a first angle sensor whose measurement range is Ω, and obtaining a measured angle $\theta_M'$ by measuring a relative rotational angle θ' of the second rotatable body with a second angle sensor whose measurement range is Ω;

calculating a plurality of relative rotational angles θ's of the second rotational body that correspond to the $\Psi_M'$, by using a functional relation between the relative rotational angle Ψ' of the first rotatable body and the relative rotational angle θ' of the second rotatable body, and obtaining calculation of angles θc's, the θc's being calculated by using a functional relation defined by the relative rotational angles of the first and second rotatable bodies;

obtaining a frequency i of the first rotatably body by comparing the plurality of θc's to the $\theta_M'$;

obtaining an absolute rotational angle Ψ of the first rotatable body by using the i, and obtaining an absolute rotational angle Φ1 of a steering shaft out of a relation between the Ψ and an absolute rotational angle θ of the second rotatable body; and obtaining an absolute steering angle Φa of a steering shaft that corresponds to the $\Psi_M'$ and the $\theta_M'$, by using a functional relation between Ψ and θ, a difference between the absolute rotational angle of the first rotatable body Ψ and the absolute rotational angle of the second rotatably body θ, and the absolute steering angle of the steering shaft Φa, and if a difference between the Φ1 and the Φa is greater than a predetermined value, adding/subtracting to/from the Φ1 a value that is obtained by dividing the Ω by a rotation ratio of the first rotatably body.

2. The method for measuring the absolute steering angle according to claim 1, wherein the plurality of measured angles $\theta_c$'s are predetermined, the plurality of measured angles $\theta_c$'s being obtained by measuring the relative rotational angle of the first rotatable body and the relative rotational angle of the second rotatable body based on a variation of the steering angle of the steering shaft.

3. The method for measuring the absolute steering angle according to claim 1, wherein the absolute rotational angle Φ1 of the steering shaft is defined by the equation:

$$\Phi 1=1/r1(\Psi_M'+i\Omega),$$

and r1 defines a rotation ratio of the steering shaft to the first rotatable body.

4. The method for measuring the absolute steering angle according to claim 1, wherein the relative rotational angle Ψ of the first rotatable body minus the relative rotational angle θ of the second rotatable body is defined by the equation:

$$\Psi-\theta=\Psi_M'-\theta_M'+\Omega.$$

* * * * *